United States Patent

Takai

(10) Patent No.: US 10,015,381 B2
(45) Date of Patent: Jul. 3, 2018

(54) IMAGING SYSTEM, ILLUMINATION APPARATUS, AND CONTROLLING METHOD

(71) Applicant: CANON KABUSHIKI KAISHA, Tokyo (JP)

(72) Inventor: Junji Takai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 14/848,100

(22) Filed: Sep. 8, 2015

(65) Prior Publication Data

US 2016/0072994 A1    Mar. 10, 2016

(30) Foreign Application Priority Data

Sep. 10, 2014   (JP) .................. 2014-184402

(51) Int. Cl.
  *H04N 5/225*   (2006.01)
  *G03B 15/05*   (2006.01)
  *H04N 5/235*   (2006.01)

(52) U.S. Cl.
  CPC .......... *H04N 5/2256* (2013.01); *G03B 15/05* (2013.01); *H04N 5/2354* (2013.01); *G03B 2206/00* (2013.01); *G03B 2215/0521* (2013.01)

(58) Field of Classification Search
  CPC .... H04N 5/2256; H04N 5/2354; G03B 15/05; G03B 2215/0521; G03B 2206/00
  USPC .......................................................... 348/371
  See application file for complete search history.

(56) References Cited

U.S. PATENT DOCUMENTS

| | | | |
|---|---|---|---|
| 2013/0193853 A1* | 8/2013 | Gouji | H05B 37/02 315/130 |
| 2015/0131257 A1* | 5/2015 | Kaimoto | G03B 15/05 362/5 |

FOREIGN PATENT DOCUMENTS

| | | |
|---|---|---|
| CN | 1580931 A | 2/2005 |
| CN | 101504508 A | 8/2009 |
| CN | 103246132 A | 8/2013 |
| JP | 63-204238 A | 8/1988 |
| JP | 2011-137960 A | 7/2011 |
| JP | 2013-178354 A | 9/2013 |
| WO | 2013/161224 A1 | 10/2013 |

* cited by examiner

*Primary Examiner* — Lin Ye
*Assistant Examiner* — Chan Nguyen
(74) *Attorney, Agent, or Firm* — Canon U.S.A., Inc. IP Division

(57) ABSTRACT

An imaging system includes an illumination apparatus and imaging apparatus, and the illumination apparatus includes a light emitting unit, a movable unit including the light emitting unit, and configured to be rotatably held to a main body unit, a driving unit configured to drive the movable unit, a calculating unit configured to calculate an illumination direction of the light emitting unit, and a transmitting unit configured to transmit, to the imaging apparatus, information about a charged voltage of a capacitor for storing energy to cause the light emitting unit to emit light. The transmitting unit transmits, to the imaging apparatus, information indicating that the charged voltage of the capacitor is less than the predetermined value, when the driving unit is used to drive the movable unit to cause the calculating unit to calculate the illumination direction, even if the charged voltage of the capacitor is a predetermined value or more.

16 Claims, 6 Drawing Sheets

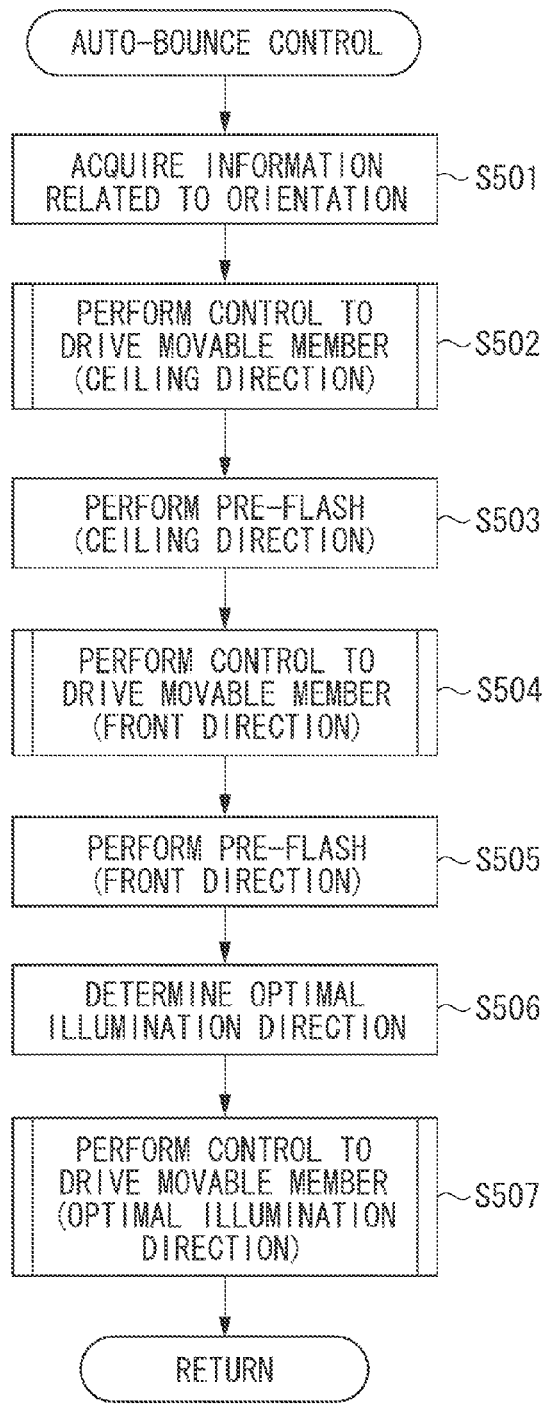

IMAGING SYSTEM, ILLUMINATION APPARATUS, AND CONTROLLING METHOD

BACKGROUND OF THE INVENTION

Field of the Invention

The present invention relates to flash photographing control to cause an illumination apparatus to emit light.

Description of the Related Art

Flash photographing (referred to as bounce flash photographing) by emitting light of an illumination apparatus toward a ceiling and irradiating an object with diffuse-reflected light from a ceiling is conventionally known. According to the bounce flash photographing, it is possible to indirectly instead of directly irradiate an object with light of the illumination apparatus and portray an object with soft light.

Further, a technique for automatically determining an optimum illumination direction for bounce flash photographing is also proposed. Japanese Patent Application Laid-Open No. 2013-178354 discusses a technique for calculating a bounce illumination angle based on information about a distance to the object and information about a distance to a reflector, and driving a light emitting unit based on the calculated illumination angle.

However, according to a conventional technique discussed in Japanese Patent Application Laid-Open No. 2013-178354, an imaging apparatus which cannot detect that a light emitting unit of a stroboscopic device is in the middle of driving, performs the flash photographing irrespective of a state of the light emitting unit when a photographer gives an image capturing instruction. Hence, when the flash photographing is performed in an inadequate state of the light emitting unit, an image which is only partially irradiated with light of the stroboscopic device is generated in some cases.

SUMMARY OF THE INVENTION

Therefore, the present invention is directed to preventing inadequate flash photographing from being performed.

According to an aspect of the present invention, an imaging system includes an illumination apparatus and an imaging apparatus. The illumination apparatus includes a light emitting unit, a movable unit including the light emitting unit, and configured to be rotatably held to a main body unit, a driving unit configured to drive the movable unit, a calculating unit configured to calculate an illumination direction of the light emitting unit, and a transmitting unit configured to transmit, to the imaging apparatus, information about a charged voltage of a capacitor for storing energy to cause the light emitting unit to emit light. The transmitting unit transmits, to the imaging apparatus, information indicating that the charged voltage of the capacitor is less than the predetermined value when the driving unit is used to drive the movable unit to cause the calculating unit to calculate the illumination direction, even if the charged voltage of the capacitor is a predetermined value or more.

Further features of the present invention will become apparent from the following description of exemplary embodiments with reference to the attached drawings.

BRIEF DESCRIPTION OF THE DRAWINGS

FIGS. 5A and 5B are views illustrating auto-bounce control of the external strobe of the imaging system according to the present exemplary embodiment.

DESCRIPTION OF THE EMBODIMENTS

Various exemplary embodiments, features, and aspects of the invention will be described in detail below with reference to the drawings.

Figure 1:
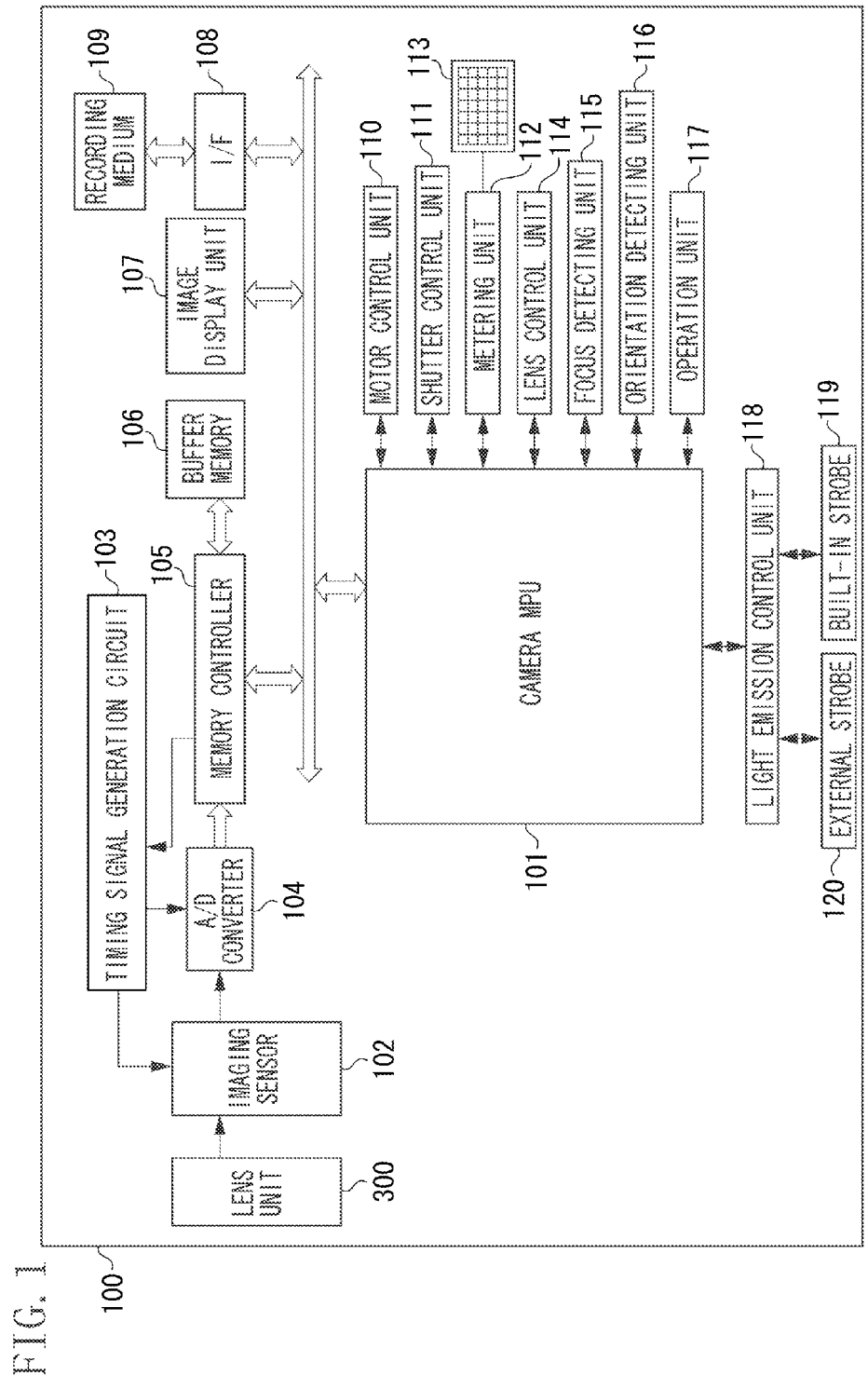
FIG. 1 is a block diagram illustrating a configuration example of an imaging apparatus according to an exemplary embodiment of the present invention.

First, a configuration of a camera 100 which is an imaging apparatus according to the present exemplary embodiment will be described according to FIG. 1 which is a block diagram illustrating a configuration example of the camera 100.

A camera micro processing unit (MPU) 101 is a micro controller which controls an entire operation of the camera 100. An imaging element 102 is an element such as a charge-coupled device (CCD) or a complementary metal-oxide semiconductor (CMOS) which converts reflected light from an object into an electric signal. A timing signal generation circuit 103 generates a timing signal which is necessary to cause the imaging element 102 to operate. An analog-digital (A/D) converter 104 converts analog image data read from the imaging element 102 into digital image data. A memory controller 105 controls an operation of reading and writing data from and to a memory and a refresh operation of a buffer memory 106. An image display unit 107 displays image data stored in the buffer memory 106. An interface 108 is an interface which connects with a recording medium 109 such as a memory card or a hard disk. By controlling a motor (not illustrated) according to a signal from the camera MPU 101, a motor control unit 110 moves a mirror (not illustrated) up or down to change an optical path of a light flux incident from a lens unit 300. When the mirror is moved up, the incident light flux via the lens unit 300 is led to the imaging element 102 and the like, and, when the mirror is moved down, the incident light flux via the lens unit 300 is led to a metering sensor 113 and the like.

A shutter control unit 111 controls a shutter (not illustrated) which is arranged in front of the imaging element 102 and switches the imaging element 102 between a light shielding state and an exposure state according to a signal from the camera MPU 101.

A metering unit 112 outputs to the camera MPU 101 a light metering value which is a light metering result of each area based on an output of the metering sensor 113 acquired by dividing a photographing screen into a plurality of areas. The camera MPU 101 performs exposure calculation to determine an AV (diaphragm value), a TV (shutter speed), and an ISO (photographing sensitivity) which are exposure control values usable at the time of photographing based on the light metering value of each area.

Further, the camera MPU 101 calculates the amount of light emission of a built-in strobe 119 or an external strobe 120 usable at the time of flash photographing based on the light metering value output from metering unit 112 when the built-in strobe 119 or the external strobe 120 performs pre-flash toward an object.

The lens control unit 114 adjusts a focus and a diaphragm of the lens unit 300 by controlling a lens drive motor and a diaphragm drive motor (not illustrated) according to a signal from the camera MPU 101.

A focus detecting unit 115 outputs a defocus amount of each focusing point to the camera MPU 101 based on an output of a focus detecting sensor including a plurality of focusing points in the photographing screen. The camera MPU 101 instructs the lens control unit 114 to execute a focus adjusting operation based on the defocus amount output from the focus detecting unit 115.

An orientation detecting unit 116 includes an acceleration sensor and the like, and detects an orientation of the camera 100 with respect to a direction of gravity.

An operation unit 117 includes a power switch and a release button which receives a photographing preparation operation or photographing operation start instruction. When SW1 is switched ON by a first stroke (half stroke) of the release button, the camera MPU 101 starts the photographing preparation operation such as a focus detecting operation and a metering operation. Further, when SW2 is switched ON by a second stroke (full stroke) of the release button, the camera MPU 101 starts the photographing operation.

Further, the operation unit 117 includes an auto-bounce switch which selects whether to execute a function of automatically determining an optimum illumination direction for bounce flash photographing (referred to as auto-bounce).

A light emission control unit 118 controls a light emission pattern such as pre-flash or main flash and controls the amount of light emission according to a signal from the camera MPU 101 when using the built-in strobe 119.

Further, the light emission control unit 118 performs control to select whether the built-in strobe 119 or the external strobe 120 is applied, according to a signal from the camera MPU 101. Further, the camera MPU 101 and the external strobe 120 communicate with each other through the light emission control unit 118.

Figure 3:
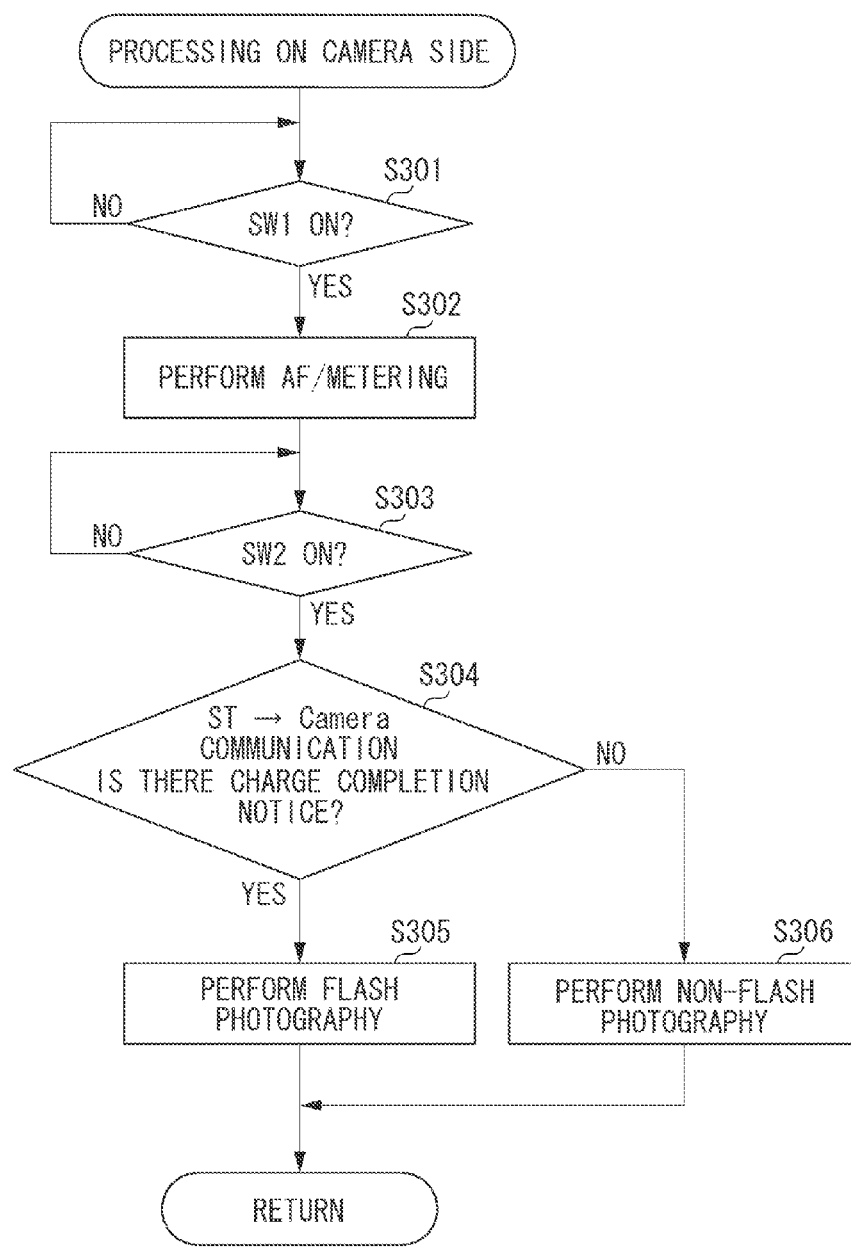
FIG. 3 is a view illustrating various types of processing of a camera in an imaging system according to the present exemplary embodiment.

In the present exemplary embodiment, a case is described where the imaging system including the camera 100 and the external strobe 120 applies control according to a signal from the camera MPU 101 to the external strobe 120 as illustrated in FIG. 3.

Figure 2:
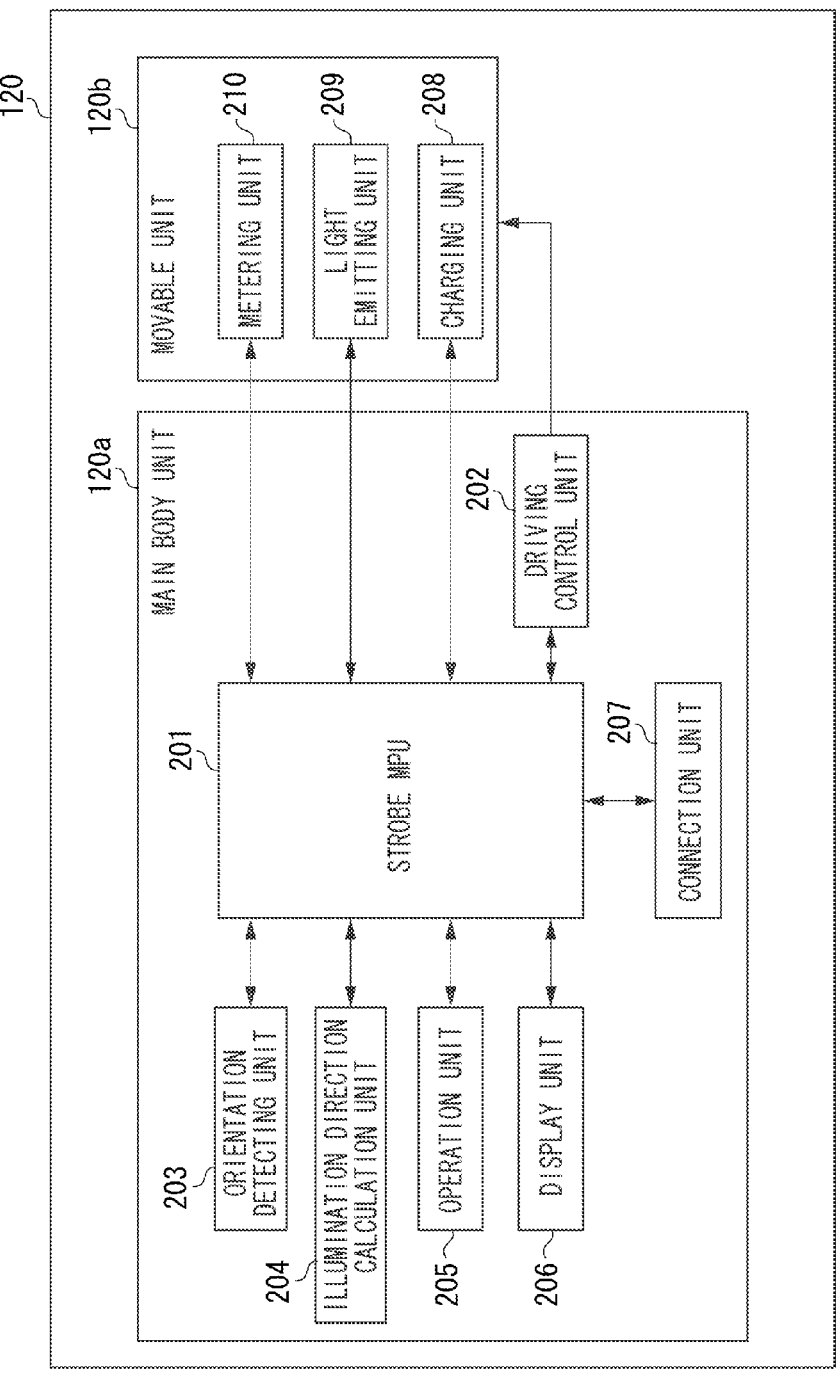
FIG. 2 is a block diagram illustrating a configuration example of an illumination apparatus according to the exemplary embodiment of the present invention.

Next, a configuration of the external strobe 120 which is the illumination apparatus will be described according to FIG. 2 which is a block diagram illustrating a configuration example of the external strobe 120.

The external strobe 120 includes a main body unit 120a which is attached to the camera 100, and a movable unit 120b which is rotatably held the main body unit 120a in a vertical direction and a horizontal direction. In addition, a mechanism which rotatably holds the movable unit 120b to the main body unit 120a in the vertical direction and the horizontal direction may be a known mechanism, and will not be described in detail since mechanisms discussed in Japanese Patent Application Laid-Open No. 63-204238 and Japanese Patent Application Laid-Open No. 2011-137960, for example, can be used.

The main body unit 120a includes a strobe MPU 201, a drive control unit 202, an orientation detecting unit 203, an illumination direction calculating unit 204, an operation unit 205, a display unit 206 and a connection unit 207. Meanwhile, the movable unit 120b includes a charging unit 208, a light emitting unit 209 and a metering unit 210.

The strobe MPU 201 is a micro controller which controls the entire operation of the external strobe 120 such as a charging sequence, a flash control sequence and an auto-bounce sequence.

The drive control unit 202 drives the movable unit 120b to the main body unit 120a in the vertical direction and the horizontal direction by controlling the motor (not illustrated) according to the signal from the strobe MPU 201. Further, the drive control unit 202 acquires a drive amount from a reference position of the movable unit 120b to the main body unit 120a by using an encoder, and outputs the drive amount to the strobe MPU 201. The reference position of the movable unit 120b to the main body unit 120a may be set, for example, to a position at which a longitudinal direction center axis of the movable unit 120b and an imaging optical axis of the imaging apparatus do not intersect when the imaging apparatus is attached.

The orientation detecting unit 203 includes an acceleration sensor, and detects an orientation of the main body unit 120a. The orientation detecting unit 203 outputs a longitudinal direction inclination angle of the main body unit 120a to a direction of gravity, for example, as information about the orientation of main body unit 120a. The illumination direction calculating unit 204 calculates an optimum illumination direction of bounce flash photographing based on the information acquired by the orientation detecting unit 203 and the information acquired by the metering unit 210 described below. Details of processing of calculating the illumination direction will be described below.

The operation unit 205 includes a power switch and an auto-bounce switch which selects whether to execute the auto-bounce. Further, the operation unit 205 includes an auto-bounce button for giving an auto-bounce start instruction in a state where the auto-bounce switch has made a setting to execute the auto-bounce. In addition, when the auto-bounce switch of the operation unit 117 of the camera 100 and the auto-bounce switch of the operation unit 205 of the external strobe 120 are set differently, one of the settings needs to be prioritized. Alternatively, the setting made by the auto-bounce switch of the operation unit 117 of the camera 100 and the setting made by the auto-bounce switch of the operation unit 205 of the external strobe 120 may work in conjunction with each other. That is, when one of the settings of the auto-bounce switches is changed, the other setting of the auto-bounce switches need to be automatically changed.

The display unit 206 displays information showing various statuses of the external strobe 120 to notify a user thereof. For example, the display unit 206 notifies the user that a charged voltage of the external strobe 120 is at a level at which the external strobe 120 can emit light, by turning ON a light-emitting diode (LED) which is switched to turn ON and turn OFF according to a charged state of the external strobe 120. In addition, an icon according to the charged state may be displayed on a liquid crystal screen of the display unit 206. Another notifying method may be used to notify information about a charged voltage of the capacitor.

The connection unit 207 is provided with an attachment unit to which the imaging apparatus is attached and a connection point which is provided with a communication contact point to communicate with the imaging apparatus, and the strobe MPU 201 communicates with the imaging apparatus through the connection point of the connection unit 207.

The charging unit 208 includes a capacitor which stores energy for causing the light emitting unit 209 described below to emit light and a step-up circuit which charges the capacitor, and performs control of charging the capacitor based on a charging instruction signal from the strobe MPU 201. Further, the charging unit 208 measures the charged voltage of the capacitor, and outputs a measurement result to the strobe MPU 201.

The light emitting unit 209 using flash tubes or LEDs as light sources includes an optical system which is made of resin in front of the light sources and causes the light sources to emit light based on a light emission signal from the strobe MPU 201.

The metering unit 210 is provided such that a light receiving surface of a light receiving sensor is directed to the same direction as the illumination direction of the light emitting unit 209, and outputs a signal according to a light flux received by the light receiving sensor to the strobe MPU 201. Further, the strobe MPU 201 calculates a distance from a light receiving surface of the optical system of the light emitting unit 209 to an illumination target based on the signal output from the metering unit 210 which has received the light flux reflected by the illumination target when the light emitting unit 209 emits light. An orientation and a position of the light receiving sensor are not limited to the above example, and the light receiving sensor may be configured to receive a reflected light flux from an illumination target through a light guide member such as optical fibers provided such that an optical incidence plane is directed to the same direction as the illumination direction of the light emitting unit 209.

Figure 4:
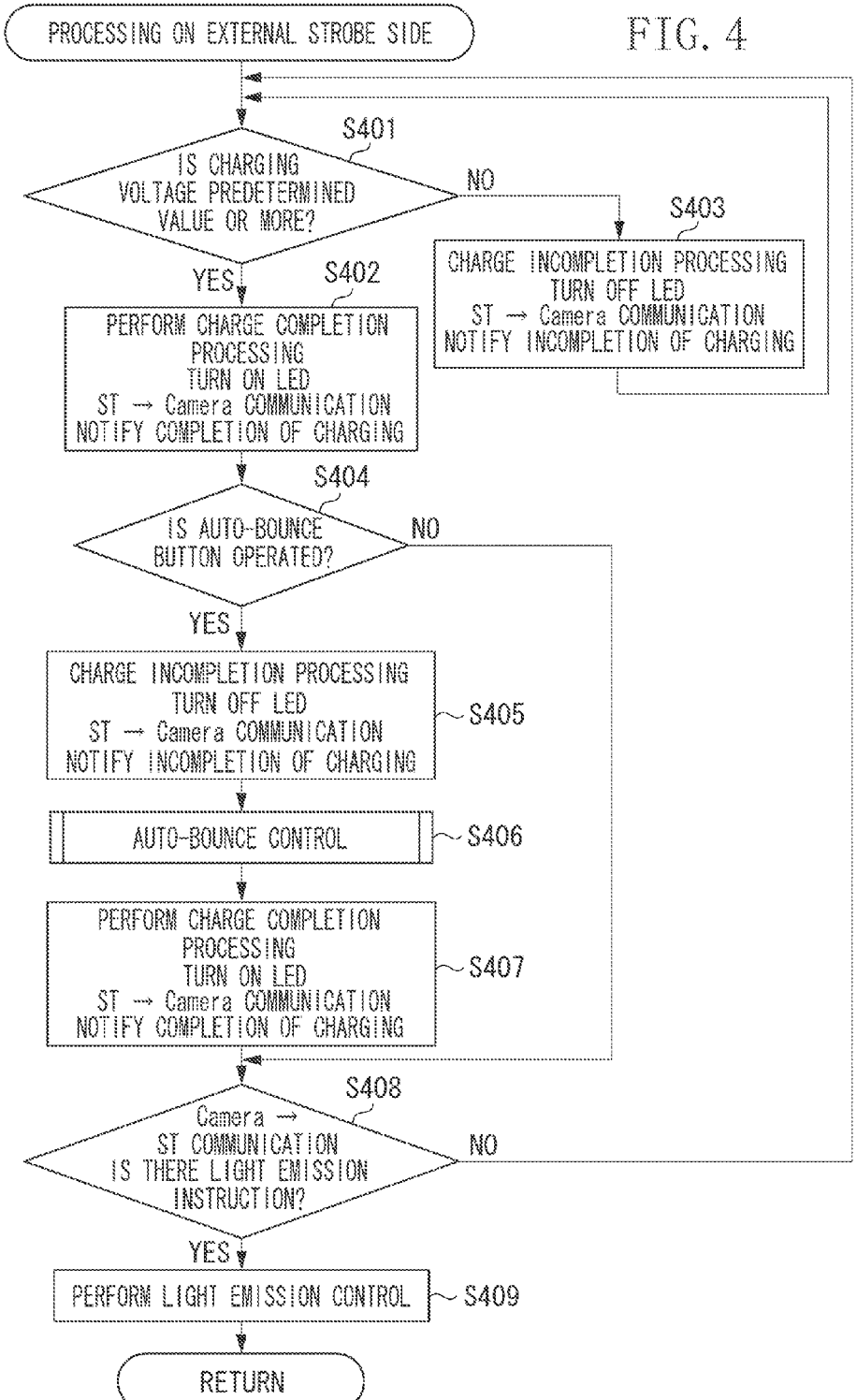
FIG. 4 is a view illustrating various types of processing of an external strobe in the imaging system according to the present exemplary embodiment.
Figure 5B:
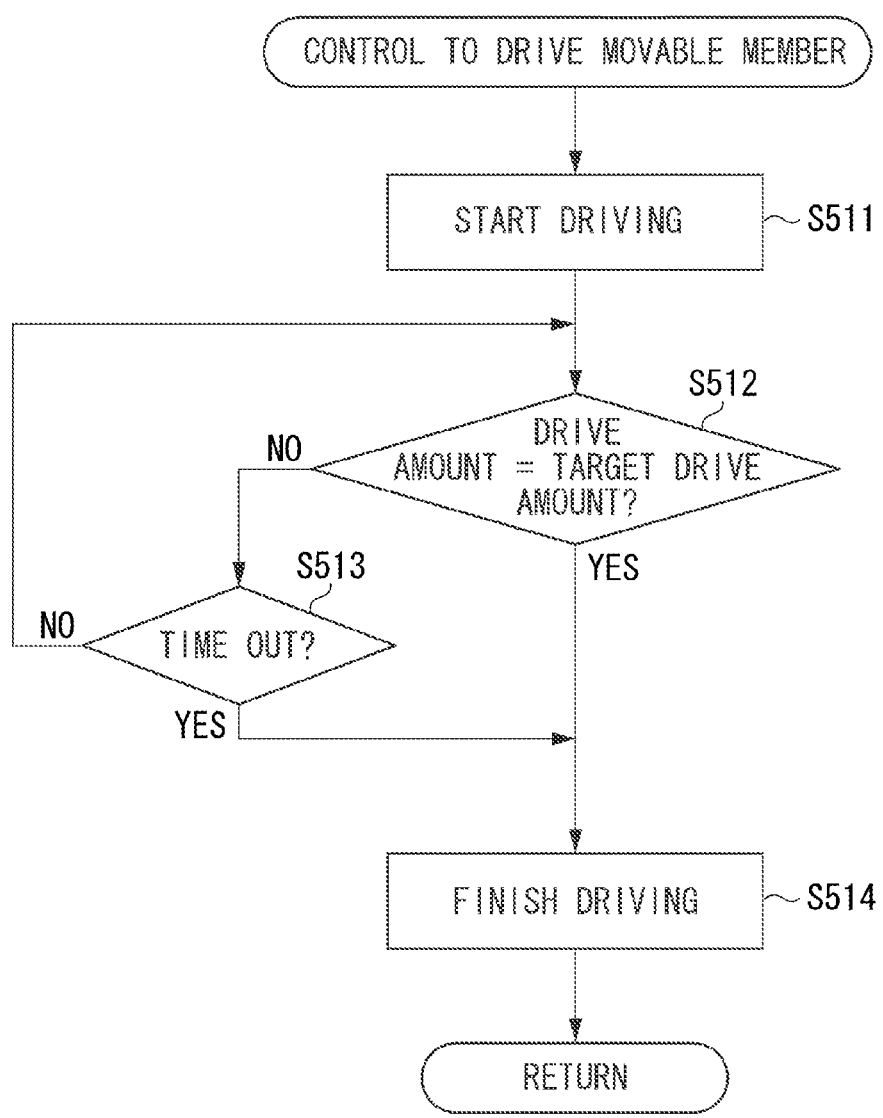

Next, various types of processing of the camera 100 and the external strobe 120 of the imaging system according to the present exemplary embodiment will be described according to FIGS. 3 to 5. FIG. 3 is a flowchart illustrating the processing of the camera 100, and FIGS. 4 and 5 are flowcharts illustrating processing of the external strobe 120.

First, the processing of the camera 100 will be described. When the power switch included in the operation unit 117 is switched to ON to enable the camera MPU 101 of the camera 100 to operate, the camera MPU 101 starts the flowchart illustrated in FIG. 3.

In step S301, the camera MPU 101 determines whether SW1 is switched ON by operating the operation unit 117, and transitions to step S302 if SW1 is ON (Yes in step S301) and repeats step S301 if SW1 is OFF (No in step S301).

In step S302, the camera MPU 101 instructs the lens control unit 114 to execute focus adjustment operation (AF), and instructs the metering unit 112 to execute metering. Further, the camera MPU 101 performs exposure calculation based on the light metering value acquired by performing the metering, and determines exposure control values at the time of photographing. In this regard, the exposure control value for flash photographing and the exposure control value for non-flash photographing are respectively determined according to a program diagram stored in advance in the memory of the camera MPU 101.

In step S303, the camera MPU 101 determines whether SW2 is switched ON by operating the operation unit 117, and transitions to step S304 if SW2 is ON (Yes in step S303) and repeats step S303 if SW2 is OFF (No in step S303).

In step S304, the camera MPU 101 determines whether the charged voltage of the external strobe 120 is at a level at which light can be emitted. This determination is made by using information indicating that the charged voltage is at a level at which light can be emitted, and information indicating that the charged voltage is not at a level at which light can be emitted, which is transmitted from the external strobe 120 as described below.

The camera MPU 101 transitions to step S305 if the charged voltage of the external strobe 120 is at a level at which light can be emitted (Yes in step S304), and transitions to step S306 if the charged voltage is not at a level at which light can be emitted (No in step S304).

In step S305, the camera MPU 101 performs flash photographing. According to a flash photographing procedure, the camera MPU 101 first instructs the light emission control unit 118 to perform pre-flash at a predetermined amount of light emission, and causes the external strobe 120 to transmit a pre-flash execution instruction. Further, in response to the pre-flash performed by the external strobe 120 according to the pre-flash execution instruction, the camera MPU 101 instructs the metering unit 112 to execute metering upon pre-flash, and calculates the amount of main flash based on the acquired light metering value (pre-flash light metering value). Next, the camera MPU 101 instructs the light emission control unit 118 to perform main flash at the calculated amount of main flash, and causes the external strobe 120 to transmit a main flash execution instruction. Further, in response to the main flash performed by the external strobe 120 according to the main flash execution instruction, the camera MPU 101 exposes the imaging element 102 by using the exposure control value for the flash photographing determined in step S302. Flash photographing is performed in this way.

In step S306, the camera MPU 101 exposes the imaging element 102 by using the exposure control value for non-flash photographing determined in step S302 without transmitting main flash execution instruction to the external strobe 120. Thus, non-flash photographing is performed.

Next, the processing of the external strobe 120 will be described. When the power switch included in the operation unit 205 is switched to ON and the external strobe 120 is powered ON to enable the strobe MPU 201 of the external strobe 120 to operate, the strobe MPU 201 starts the flowchart illustrated in FIG. 4. In addition, in FIG. 4, the external strobe 120 is set such that the auto-bounce switch executes auto-bounce.

In step S401, the strobe MPU 201 determines whether the charged voltage of the capacitor included in the charging unit 208 is at a level at which light can be emitted. The strobe MPU 201 transitions to step S402 if the charged voltage is at a level at which light can be emitted (a predetermined value or more) (Yes in step S401), and transitions to step S403 if the charged voltage is less than a level at which light can be emitted (less than the predetermined value) (No in step S401). The predetermined value used to determine whether the charged voltage is at a level at which light can be emitted may be set based on light emission capability of the light emitting unit 209.

In step S402, the strobe MPU 201 transmits a charging completion notice as information indicating that the charged voltage is at a level at which light can be emitted, to the camera 100 through the connection unit 207. Further, the strobe MPU 201 causes the display unit 206 to notify a user that the charged voltage is at a level at which light can be emitted. For example, the strobe MPU 201 causes the display unit 206 to switch LEDs for notifying a charged state to a turned-ON state or display on the liquid crystal screen an icon indicating that the charged voltage is at a level at which light can be emitted. Processing of transmitting a charging completion notice to the camera 100 through the connection unit 207 and causing the display unit 206 to notify the user that the charged voltage is at a level at which light can be emitted will be hereinafter referred to as charge completion processing.

In step S403, the strobe MPU 201 transmits a charging incompletion notice as information indicating that the charged voltage is not at a level at which light can be emitted, to the camera 100 through the connection unit 207. Further, the strobe MPU 201 causes the display unit 206 to notify the user of the same information as information indicating that the charged voltage is not at a level at which light can be emitted. For example, the strobe MPU 201 causes the display unit 206 to switch LEDs for notifying the charged state to a turned-off state or display on the liquid crystal screen an icon indicating that the charged voltage is not at a level at which light can be emitted. Processing of transmitting the charging incompletion notice to the camera 100 through the connection unit 207 and causing the display unit 206 to notify the user that the charged voltage is not at a level at which light can be emitted will be referred to as charging incompletion processing.

In step S404, the strobe MPU 201 determines whether the auto-bounce button included in the operation unit 205 has been operated.

The strobe MPU 201 transitions to step S405 if the auto-bounce button has been operated (Yes in step S404), and transitions to step S408 if the auto-bounce button has not been operated (No in step S404).

In step S405, the strobe MPU 201 performs the above-described charging incompletion processing even though the charged voltage is at a level at which light can be emitted. That is, the strobe MPU 201 transmits the charging incompletion notice to the camera 100 through the connection unit 207, and causes the display unit 206 to notify the user of the same information as information indicating that the charged voltage is not at a level at which light can be emitted.

According to the above-described processing of the camera 100 in FIG. 3, non-flash photographing is performed in a state where information from the external strobe 120 indicating that the charged voltage is not at a level at which light can be emitted is acquired. In step S405, by transmitting the charging incompletion notice to the camera 100 through the connection unit 207, it is possible to prevent flash photographing even when the charged voltage is at a level at which light can be emitted.

Further, the display unit 206 notifies the user that the charged voltage is not at a level at which light can be emitted, and it is possible to prevent the user who wants to perform flash photographing, from switching SW2 to ON.

In step S406, the strobe MPU 201 performs auto-bounce control described below.

After finishing the auto-bounce control, in step S407, the strobe MPU 201 performs the above-described charging completion processing. That is, the strobe MPU 201 transmits the charging completion notice to the camera 100 through the connection unit 207, and causes the display unit 206 to notify the user that the charged voltage is at a level at which light can be emitted.

As described above, when the external strobe 120 performs the auto-bounce control, it is possible to prevent flash photographing from being inadequately performed during the auto-bounce control by transmitting information indicating that the charged voltage is not a level at which light can be emitted from the external strobe 120 to the camera 100. Further, when the auto-bounce control is finished, the external strobe 120 transmits to the camera 100 information indicating that the charged voltage is not at a level at which light can be emitted. Consequently, it is possible to perform flash photographing as usual.

In step S408, the strobe MPU 201 determines whether the camera 100 makes a flash instruction (a pre-flash execution instruction or a main flash execution instruction). The strobe MPU 201 transitions to step S409 if the flash instruction accompanying flash photographing is made (Yes in step S408), and returns to step S401 if an execution instruction is not made (No in step S408).

In step S409, the strobe MPU 201 performs flash control according to the flash execution instruction from the camera 100, and finishes the flowchart.

Next, the details of the auto-bounce control in step S406 will be described according to FIG. 5.

In step S501, the strobe MPU 201 acquires information about the orientation of the main body unit 120a from the orientation detecting unit 203.

In step S502, the strobe MPU 201 instructs the drive control unit 202 to drive the movable unit 120b such that the illumination direction is opposite to the direction of gravity (ceiling direction). In this case, the strobe MPU 201 calculates the drive amount of the movable unit 120b which is necessary to direct the illumination direction to the ceiling direction based on the information about the orientation of the main body unit 120a and the current drive amount from the reference position of the movable unit 120b.

In step S503, the strobe MPU 201 drives the movable unit 120b such that the illumination direction is directed to the ceiling direction, and then instructs the light emitting unit 209 to perform pre-flash. Further, the strobe MPU 201 instructs metering unit 210 to execute pre-flash metering, and calculates a distance from the light receiving surface of the light emitting unit 209 to the ceiling based on the acquired light metering value (pre-flash light metering value). The distance from the light receiving surface of the light emitting unit 209 to the ceiling may be calculated by using a method for assuming a pre-flash light metering value in case where an illumination target of a predetermined reflectance is at a predetermined distance, and calculating an actual distance to the illumination target based on a difference between the assumed pre-flash light metering value and the actual pre-flash light metering value, for example. In this case, the light flux received by the metering unit 210 is a light flux radiated from the light emitting unit 209 and reflected on the illumination target, and therefore an optical path length of the light flux received by the metering unit 210 and a double distance from the light receiving surface of the light emitting unit 209 to the ceiling do not match. However, a difference between positions of the light receiving sensor of the metering unit 210 and the light receiving surface of the light emitting unit 209 influences determination of the illumination direction in the bounce flash photographing a little. Therefore, in the present exemplary embodiment, calculation is performed assuming that the positions of the light receiving sensor of the metering unit 210 and the light receiving surface of the light emitting unit 209 are the same.

Next, in step S504, the strobe MPU 201 instructs the drive control unit 202 to drive the movable unit 120b such that the illumination direction is directed to a photographing direction (front direction). In addition, in the present exemplary embodiment, when the orientation of the main body unit 120a is at a positive position, and the movable unit 120b is at the reference position, the illumination direction is directed to the photographing direction. Hence, the strobe MPU 201 calculates the drive amount of the movable unit 120b which is necessary to direct the illumination direction to the front direction, based on the information about the orientation of the main body unit 120a and the current drive amount from the reference position of the movable unit 120b.

In step S505, the strobe MPU 201 drives the movable unit 120b such that the illumination direction is directed to the front direction, and then instructs the light emitting unit 209 to perform pre-flash in the same way as in step S503. Further, the strobe MPU 201 instructs the metering unit 210 to execute pre-flash metering, and calculates a distance from the light receiving surface of light emitting unit 209 to the object based on the acquired light metering value (pre-flash light metering value).

Next, in step S506, the strobe MPU 201 instructs the illumination direction calculating unit 204 to determine an optimum illumination direction for the bounce flash photographing. The illumination direction calculating unit 204 determines the optimum illumination direction for the bounce flash photographing based on the information about the orientation of the main body unit 120a, the distance from the light receiving surface of the light emitting unit 209 to the ceiling and the distance from the light receiving surface of the light emitting unit 209 to the object. For example, there is a method for determining an illumination direction according to following equation (1) when a distance from the light receiving surface of the light emitting unit 209 to the ceiling is d, a distance from the light receiving surface of the light emitting unit 209 to the object is D, and an angle of the movable unit 120b to the main body unit 120a which is the optimum illumination direction is θ.

$$\theta = \tan^{-1}(2d/D) \quad (1)$$

The angle calculated according to the above equation (1) is an angle usable when the orientation of the external strobe 120 is at a positive position, and therefore the angle corrected according to an inclination angle of the orientation of the main body unit 120a is determined as the angle of the movable unit 120b which is the optimum illumination direction for the bounce flash photographing.

In step S507, the strobe MPU 201 instructs the drive control unit 202 to drive the movable unit 120b such that the illumination is directed to the direction determined in step S506. Subsequently, controlling driving of the movable unit 120b in steps S502, S504, and S507 will be described.

In step S511, the drive control unit 202 controls the motor (not illustrated) according to an instruction from the strobe MPU 201, and starts driving the movable unit 120b.

In step S512, the drive control unit 202 compares the drive amount from the reference position of the movable unit 120b acquired by using the encoder and a drive amount from the reference position of the movable unit 120b for directing the illumination to the target illumination direction (target drive amount). The strobe MPU 201 transitions to step S514 if the acquired drive amount and the target drive amount match (Yes in step S512), and transitions to step S513 if the acquired drive amount and the target drive amount do not match (No in step S512).

In step S513, the strobe MPU 201 determines whether a predetermined time or more has lapsed after the movable unit 120b starts being driven. The lapse of time after the movable unit 120b starts being driven may be measured by a timer of the strobe MPU 201.

The strobe MPU 201 transitions to step S514 if a time-out error occurs since the lapse of time is the predetermined time or more (Yes in step S513), and returns to step S512 if the lapse of time is not the predetermined time or more (No in step S513). In step S514, the drive control unit 202 controls the motor and finishes driving the movable unit 120b.

As described above, in the present exemplary embodiment, while an operation of automatically determining the illumination direction of the illumination apparatus is performed, it is possible to prevent flash photographing from being inadequately performed by transmitting information indicating that a charged voltage is not at a level at which light can be emitted, to the imaging apparatus. Further, by causing the display unit 206 to notify the user of the same information as information indicating that the charging level is not at a level at which light can be emitted, it is possible to prevent the user who wants to perform flash photographing from switching SW2 to ON. By performing one of transmission of information to the imaging apparatus and notification to the user, it is possible to prevent flash photographing from being inadequately performed. However, by performing both of the transmission and the notification, it is possible to more effectively prevent the flash photographing from being inadequately performed.

In addition, in the above exemplary embodiment, information acquired by the metering unit 210 and the orientation detecting unit 203 of the external strobe 120 has been used to determine an optimum illumination direction. However, information acquired by the camera 100 may be used. As one example, in a state where the external strobe 120 is attached to the camera 100, an orientation of the camera 100 and an orientation of the external strobe 120 have predetermined correspondences. Therefore, information about an orientation of the camera 100 may be used instead of information about an orientation of the external strobe 120. Further, in another example, a distance from the light emitting unit 209 to the object can be calculated based on lens information of the lens unit 300. Hence, a distance from the light emitting unit 209 to the object may be calculated based on information of the lens unit 300.

Furthermore, as a method for calculating a distance from the light emitting unit 209 to an object and a distance from the light emitting unit 209 to a ceiling, a method for directing an infrared emission unit and an infrared receiving unit to an illumination direction of the light emitting unit 209, emitting an infrared ray to an object or a ceiling, and calculating the distance may be used.

Further, as a method for determining an optimum illumination direction for the bounce flash photographing, a method for performing pre-flash by finely changing not only the front direction and the ceiling direction but also the illumination direction, and determining as an optimum direction the illumination direction which brings an optimum result of a pre-flash light metering value for the bounce flash photographing may be used. Alternatively, a method for performing pre-flash by finely changing an illumination direction, and determining as an optimum direction an illumination direction which brings an optimum result of a luminance distribution of an image exposed to the imaging element 102 during pre-flash may be used.

Further, in the above exemplary embodiment, the movable unit 120b is driven in the ceiling direction upon the auto-bounce operation to determine the illumination direction. However, the movable unit 120b may also be driven in a direction orthogonal to the ceiling direction.

Furthermore, in the above exemplary embodiment, the movable unit 120b is driven in the ceiling direction upon the auto-bounce operation and then is driven in the front direction. However, the movable unit 120b may be driven in the front direction and then driven in the ceiling direction.

Still further, the camera MPU 101 may perform at least part of calculation performed by the external strobe 120 to determine an optimum illumination direction for the bounce flash photographing.

Moreover, the illumination apparatus whose movable unit can rotate to the main body unit in the vertical direction and the horizontal direction has been described in the above exemplary embodiment. However, an illumination apparatus may have a movable unit which can rotate to the main body unit in one of the vertical direction and the horizontal direction. The preferable exemplary embodiment of the present invention has been described. However, the present invention is not limited to this exemplary embodiment, and can be variously modified and changed without departing from the spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-184402, filed Sep. 10, 2014, which is hereby incorporated by reference herein in its entirety.

What is claimed is:

1. An imaging system comprising:
an illumination apparatus; and
an imaging apparatus, wherein
the illumination apparatus includes:
   a light emitting unit;
   a movable unit including the light emitting unit, and configured to be rotatably held to a main body unit;
   a driving unit configured to drive the movable unit;
   a calculating unit configured to calculate an illumination direction of the light emitting unit; and
   a transmitting unit configured to transmit, to the imaging apparatus, information about a charged voltage of a capacitor for storing energy to cause the light emitting unit to emit light, and
the transmitting unit transmits, to the imaging apparatus, information indicating that the charged voltage of the capacitor is less than the predetermined value, when the driving unit is used to drive the movable unit to cause the calculating unit to calculate the illumination direction, even if the charged voltage of the capacitor is a predetermined value or more.

2. The imaging system according to claim 1, wherein the transmitting unit transmits to the imaging apparatus the information indicating that the charged voltage of the capacitor is the predetermined value or more, when the charged voltage of the capacitor is the predetermined value or more, after the movable unit is driven.

3. The imaging system according to claim 1, further comprising an operation unit configured to receive an operation of causing the driving unit to drive the movable unit for the calculating unit to calculate the illumination direction,
wherein, the transmitting unit transmits to the imaging apparatus the information indicating that the charged voltage of the capacitor is the predetermined value or more before the operation unit is operated, and transmits, to the imaging apparatus, information indicating that the charged voltage of the capacitor is less than the predetermined value in response to the operation made via the operation unit, when the charged voltage of the capacitor is the predetermined value or more.

4. The imaging system according to claim 1, further comprising a notifying unit configured to notify information about the charged voltage of the capacitor,
wherein the notifying unit notifies same information as the information indicating that the charged voltage of the capacitor is less than the predetermined value, when the driving unit is used to drive the movable unit to cause the calculating unit to calculate the illumination direction, even if the charged voltage of the capacitor is the predetermined value or more.

5. An illumination apparatus which is attachable to an imaging apparatus, the illumination apparatus comprising:
a light emitting unit;
a movable unit including the light emitting unit, and configured to be rotatably held to a main body unit;
a driving unit configured to drive the movable unit;
a calculating unit configured to calculate an illumination direction of the light emitting unit; and
a transmitting unit configured to transmit, to the attached imaging apparatus, information about a charged voltage of a capacitor for storing energy to cause the light emitting unit to emit light,
wherein the transmitting unit transmits, to the imaging apparatus, information indicating that the charged voltage of the capacitor is less than the predetermined value, when the driving unit is used to drive the movable unit to cause the calculating unit to calculate the illumination direction, even if the charged voltage of the capacitor is a predetermined value or more.

6. The illumination apparatus according to claim 5, wherein the transmitting unit transmits to the imaging apparatus the information indicating that the charged voltage of the capacitor is the predetermined value or more, when the charged voltage of the capacitor is the predetermined value or more, after the movable unit is driven.

7. The illumination apparatus according to claim 5, further comprising an operation unit configured to receive an operation of causing the driving unit to drive the movable unit to calculate the illumination direction by the calculating unit,
    wherein the transmitting unit transmits to the imaging apparatus the information indicating that the charged voltage of the capacitor is the predetermined value or more before the operation unit is operated, and transmits, to the imaging apparatus, information indicating that the charged voltage of the capacitor is less than the predetermined value in response to the operation made via the operation unit, when the charged voltage of the capacitor is the predetermined value or more.

8. The illumination apparatus according to claim 5, further comprising a notifying unit configured to notify information about the charged voltage of the capacitor,
    wherein the notifying unit notifies same information as the information indicating that the charged voltage of the capacitor is less than the predetermined value, when the driving unit is used to drive the movable unit to cause the calculating unit to calculate the illumination direction, even if the charged voltage of the capacitor is the predetermined value or more.

9. A method for controlling an illumination apparatus which is attachable to an imaging apparatus, the illumination apparatus including:
    a light emitting unit;
    a movable unit including the light emitting unit, and configured to be rotatably held to a main body unit;
    a driving unit configured to drive the movable unit;
    a calculating unit configured to calculate an illumination direction of the light emitting unit; and
    a transmitting unit configured to transmit, to the imaging apparatus, information about a charged voltage of a capacitor for storing energy to cause the light emitting unit to emit light,
    the method comprising
    causing the transmitting unit to transmit, to the imaging apparatus, information indicating that the charged voltage of the capacitor is less than the predetermined value, when the driving unit is used to drive the movable unit to cause the calculating unit to calculate the illumination direction, even if the charged voltage of the capacitor is a predetermined value or more.

10. An imaging system comprising:
    an imaging apparatus; and
    an illumination apparatus which is connectable to the imaging apparatus, wherein
    the illumination apparatus includes:
        a first housing;
        a second housing configured to be rotatable relative to the first housing, wherein the second housing includes a light emitting unit;
        a driving unit configured to rotate the second housing relative to the first housing; and
        a transmitting unit configured to transmit information about whether the light emitting unit can emit light, wherein the transmitting unit transmits information indicating that the light emitting unit is not in a state where the light emitting unit can emit light, when the driving unit is used to rotate the second housing relative to the first housing, even if the light emitting unit is in a state where the light emitting unit can emit light, and
    the imaging apparatus includes
        a flash instruction unit configured to instruct the illumination apparatus to emit light, wherein the flash instruction unit does not issue the flash instruction accompanying photographing to the illumination apparatus until the flash instruction unit receives information indicating that the light emitting unit is in the state where the light emitting unit can emit light, when the information indicating that the light emitting unit is not in the state where the light emitting unit can emit light, is received.

11. An illumination apparatus which is connectable to an imaging apparatus, the illumination apparatus comprising:
    a first housing;
    a second housing configured to be rotatable relative to the first housing, wherein the second housing includes a light emitting unit;
    a driving unit configured to rotate the second housing relative to the first housing; and
    a transmitting unit configured to transmit, to the connected imaging apparatus, information about whether the light emitting unit is in a state where the light emitting unit can emit light, wherein the transmitting unit transmits information indicating that the light emitting unit is not in a state where the light emitting unit can emit light, when the driving unit is used to rotate the second housing relative to the first housing, even if the light emitting unit is in the state where the light emitting unit can emit light,
    wherein the transmitting unit transmits information indicating that a charged voltage of a capacitor for storing energy to cause the light emitting unit to emit light is not a predetermined value or more, as the information indicating that the light emitting unit is not in the state where the light emitting unit can emit light, and
    wherein after the driving unit is used to rotate the second housing relative to the first housing, the transmitting unit transmits the information indicating that the light emitting unit is in the state where the light emitting unit can emit light, when the transmitting unit transmits the information indicating that the light emitting unit is not in the state where the light emitting unit can emit light even if the light emitting unit is in the state where the light emitting unit can emit light.

12. The illumination apparatus according to claim 11, wherein the transmitting unit transmits information indicating that the charged voltage of the capacitor is the predetermined value or more, when the charged voltage of the capacitor is the predetermined value or more, as the information indicating that the light emitting unit is in the state where the light emitting unit can emit light.

13. The illumination apparatus according to claim 11, further comprising a notifying unit configured to notify that the light emitting unit is in the state where the light emitting unit can emit light, wherein the notifying unit does not notify that the light emitting unit is in the state where the light emitting unit can emit light, when the driving unit is used to rotate the second housing relative to the first housing, even if the light emitting unit is in the state where the light emitting unit can emit light.

14. A method for controlling an illumination apparatus which is connectable to an imaging apparatus, the illumination apparatus including:
    a first housing;
    a second housing configured to be rotatable relative to the first housing, wherein the second housing includes a light emitting unit; and
    a driving unit configured to rotate the second housing relative to the first housing,
    the method comprising causing the transmitting unit to transmit information indicating that the light emitting unit is not in a state where the light emitting unit can emit light, when the driving unit is used to rotate the second housing relative to the first housing, even if the light emitting unit is in the state where the light emitting unit can emit light, and causing the transmitting unit to transmit information indicating that a charged voltage of a capacitor for storing energy to cause the light emitting unit to emit light is not a predetermined value or more, as the information indicating that the light emitting unit is not in the state where the light emitting unit can emit light, and causing the transmitting unit to transmit the information indicating that the light emitting unit is in the state where the light emitting unit can emit light after the driving unit is used to rotate the second housing relative to the first housing, when the transmitting unit transmits the information indicating that the light emitting unit is not in the state where the light emitting unit can emit light even if the light emitting unit is in the state where the light emitting unit can emit light.

15. An illumination apparatus which is connectable to an imaging apparatus, the illumination apparatus comprising:
a light emitting unit;
a driving unit configured to change an illumination direction of light from the light emitting unit; and
a transmitting unit configured to transmit, to the attached imaging apparatus, information about a charged voltage of a capacitor for storing energy to cause the light emitting unit to emit light, wherein the transmitting unit transmits to the attached imaging apparatus the information indicating that the charged voltage of the capacitor is less than the predetermined value, when the driving unit is used to change the illumination direction of the light from the light emitting unit, even if the charged voltage of the capacitor is a predetermined value or more.

16. A method for controlling an illumination apparatus which is connectable to an imaging apparatus and which comprises a light emitting unit and a driving unit configured to change an illumination direction of light from the light emitting unit, the method comprising
transmitting to the attached imaging apparatus the information indicating that the charged voltage of the capacitor is less than the predetermined value, when the driving unit is used to change the illumination direction of the light from the light emitting unit, even if a charged voltage of a capacitor for storing energy to cause the light emitting unit to emit light is a predetermined value or more.

* * * * *